United States Patent

Narai et al.

[11] Patent Number: 5,834,649
[45] Date of Patent: Nov. 10, 1998

[54] VIBRATION SENSOR INCLUDING A MOVABLE MAGNET POSITIONED BETWEEN STATIONARY MAGNETS

[75] Inventors: Akihisa Narai, Taki-gun; Takeshi Imai, Matsusaka-city; Tsutomu Yamasawa, Osaka; Satoshi Nishida, Nara; Tsukasa Hatakenaka, Osaka; Soichi Okuhara, Kyoto, all of Japan

[73] Assignee: Omron Corporation, Kyoto, Japan

[21] Appl. No.: 664,260

[22] Filed: Jun. 7, 1996

Related U.S. Application Data

[63] Continuation of Ser. No. 371,077, Jan. 10, 1995, abandoned.

[30] Foreign Application Priority Data

| Jan. 10, 1994 | [JP] | Japan | 6-000743 |
| Feb. 3, 1994 | [JP] | Japan | 6-011436 |

[51] Int. Cl.⁶ .................................................. G01H 11/02
[52] U.S. Cl. ................................... 73/649; 200/61.45 M
[58] Field of Search ........................ 73/662, 651, 652, 73/649, 643, 632, 654; 324/207.24, 207.22; 200/61.45 M; 377/24.2, 26, 23, 19

[56] References Cited

U.S. PATENT DOCUMENTS

| 2,429,094 | 10/1947 | Kent et al. | 73/651 |
| 3,100,292 | 8/1963 | Warner et al. | |
| 3,129,347 | 4/1964 | Tognola | 73/654 |
| 3,748,415 | 7/1973 | Suzuki | 200/61.45 M |
| 3,924,261 | 12/1975 | Kardashian | 73/654 |
| 4,168,410 | 9/1979 | Norris | 200/61.45 M |
| 4,282,484 | 8/1981 | Morrow | 73/652 |
| 4,446,741 | 5/1984 | Sirokorad et al. | 73/654 |
| 4,450,326 | 5/1984 | Ledger | 200/61.45 M |
| 4,517,514 | 5/1985 | Howell | 73/652 |
| 4,680,968 | 7/1987 | Sodeikat | 73/651 |
| 4,754,644 | 7/1988 | Valentini | 73/654 |
| 4,843,877 | 7/1989 | Kushida et al. | 73/654 |
| 5,332,992 | 7/1994 | Woods | 200/61.7 |

FOREIGN PATENT DOCUMENTS

| 3428914 | 2/1986 | Germany. |
| 56-086310 | 7/1981 | Japan. |
| 56-164929 | 12/1981 | Japan. |
| 57-066308 | 4/1982 | Japan. |

*Primary Examiner*—Christine K. Oda
*Attorney, Agent, or Firm*—Morrison & Foerster LLP

[57] ABSTRACT

A vibration sensor includes a first stationary magnet, a second stationary magnet, a movable magnet positioned between the first and second stationary magnets, and a sensor for sensing movement of the movable magnet. The movable magnet is disposed in a magnetically repulsive relationship with the first stationary magnet and a magnetically attractive relationship with the second stationary magnet.

26 Claims, 6 Drawing Sheets

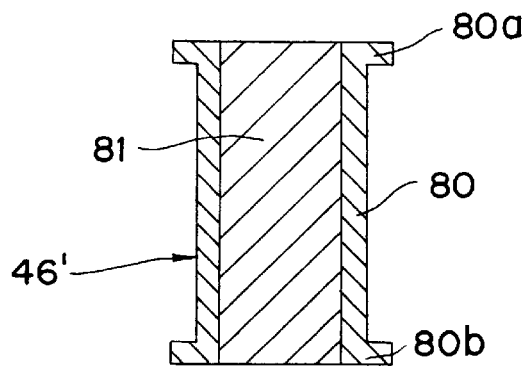
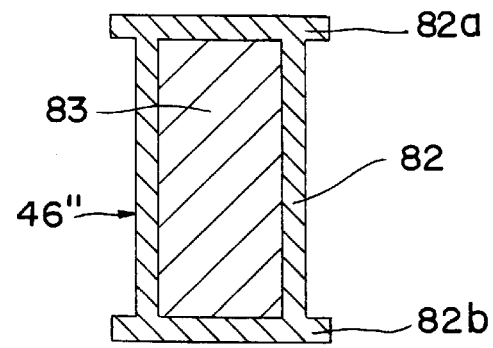
FIG. 7(a)  FIG. 7(b)
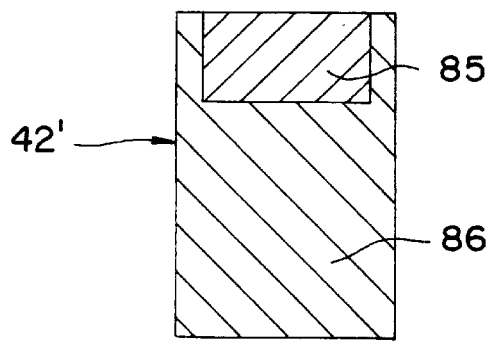
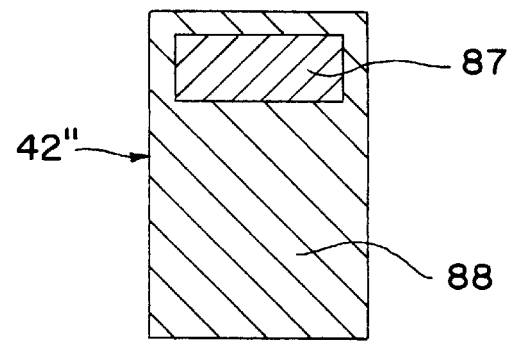
FIG. 8(a)  FIG. 8(b)

VIBRATION SENSOR INCLUDING A MOVABLE MAGNET POSITIONED BETWEEN STATIONARY MAGNETS

This application is a continuation of U.S. application Ser. No. 08/371,077, filed Jan. 10, 1995, now abandoned.

BACKGROUND OF THE INVENTION

1. Field of the Invention

This invention relates to a vibration sensor for sensing external vibration applied to the sensor, and more particularly to an improved sensor suitable for use as a sensing device employed in a pedometer for counting the number of steps.

2. Discussion of the Related Art

There is well known a sensing mechanism employed in a pedometer for counting the number of steps which includes a coil spring, a steel ball associated with the coil, and a means for mechanically counting the number of up-and-down movements of the ball applied by the vibration of walk or gallop (hereinafter called "step motion") and a biassing force of the spring.

Since the sensing mechanism mechanically senses the up-and-down movements of the steel ball, the response of the ball according to the vibration by the step motion is not preferable. Particularly, when the step motion is fast, the steps are possible to be not precisely counted, and generally the counting accuracy is not satisfactory.

SUMMARY OF THE INVENTION

It is, therefore, a primary object of this invention to provide an improved vibration sensor for sensing vibration applied to the sensor.

It is a further object of this invention to provide an improved vibration sensor employing a stationary magnet and a movable magnet being opposed to the stationary magnet, which is suitable for use as a sensing mechanism of a pedometer for precisely counting steps.

It is another object of this invention to provide an improved pedometer employing a stationary magnet, a movable magnet, and a sensing means for sensing the movement of the movable magnet.

According to an aspect of this invention, there is provided a vibration sensor including a stationary magnet, a movable magnet opposed to the stationary magnet to be moved by application of external vibration, the stationary and movable magnets being disposed in a balanced relationship, and a sensing means for sensing the movement of the movable magnet by the external vibration. The stationary and movable magnets may be positioned in a repulsive relationship, in which the movable magnet approaching the stationary magnet by an external vibration is repulsed by a magnetic repulsive motion of same magnetic poles and the repulsed movable magnet leaving the stationary magnet to a certain position is again moved toward the stationary magnet by a subsequent vibration. Thus, repeating external vibrations make the movable magnet repeat the movement.

According to a further aspect of this invention, there is provided a vibration sensor including a stationary magnet, a movable magnet to be moved by application of external vibration, the stationary and movable magnets being disposed in a vertically opposite direction and in a balanced relationship, and a sensing means for sensing the movement of the movable magnet by the external vibration. The stationary magnet may be positioned in a lower position while the movable magnet may be positioned in an upper position and balanced with gravity leaving a space to the stationary magnet. The movable magnet moved by an external vibration is repulsed by the magnetic repulsive motion with the stationary magnet, but is again moved toward the stationary magnet by subsequent external vibration. The up-and-down movement of the movable magnet is sensed by the sensing means. When this vibration sensor is employed in a pedometer carried by a walking person, a subsequent vibration is applied to the sensor on each step motion so as to be counted by the pedometer.

According to a still further aspect of this invention, there is provided a vibration sensor including a stationary magnet at a lower position, a stationary magnet or magnetic: substance at an upper position, a movable magnet held between the upper and lower positions and in a balanced relationship, and a sensing means for sensing the movement of the movable magnet. As the movable magnet is moved toward the stationary magnet at the lower position by an external vibration, it is repulsed by the stationary magnet at the lower position and attracted by the stationary magnet or magnetic substance at the upper position. The attracted movable magnet is again moved to the stationary magnet at the lower position by subsequent vibration. Thus, repeating vibrations, for example, made by step motion in a pedometer, drives the movable magnet in a up-and-down movement. In this sensing device, the biassing magnetic force by the stationary magnet or magnetic substance provides longer a stroke of the movable magnet and improves response of the movable magnet about external vibrations.

According to another aspect of this invention, there is provided a pedometer including a stationary magnet, a movable magnet to be moved by application of external vibration, the stationary and movable magnets being disposed in a vertically opposite direction and in a balanced relationship, a sensing means for sensing the movement by the movable magnet by the external vibration to generate an output, a counting means for counting the number of the outputs to generate a counted value, and a display means for displaying the counted value. The stationary magnet may be disposed at a lower position, and the movable magnet may be held at an upper position as mentioned in the above second aspect of this invention. The sensing means may be a reed switch sensing the movement of the movable magnet to generate an output to be counted by the counting means and displayed by the display means such as a LCD display.

BRIEF DESCRIPTION OF THE DRAWINGS

Other objectives and advantages of this invention will be more readily apparent from the following detailed description provided in conjunction with the following figures, of which:

FIG. 7 shows sectional views of modifications of a movable magnet;

FIG. 8 shows sectional views of modifications of stationary magnet;

DETAILED DESCRIPTION OF THE INVENTION

Figure 1:
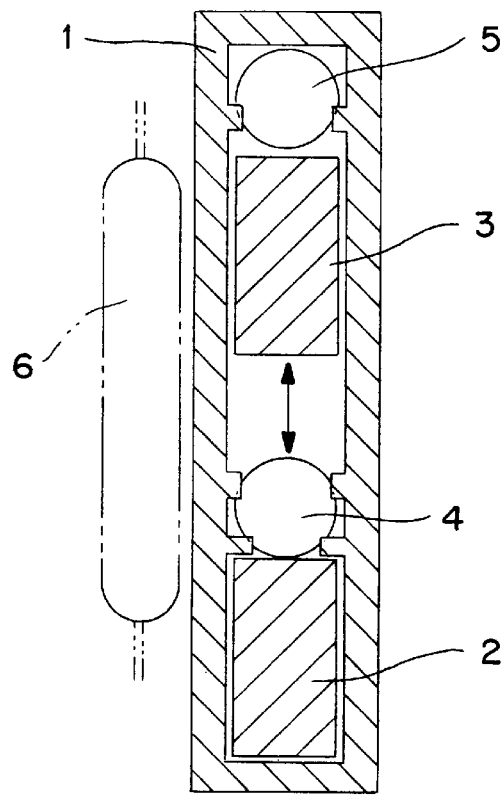
FIG. 1 is a partial sectional view of a vibration sensor as a first embodiment of this invention.
Figure 2:
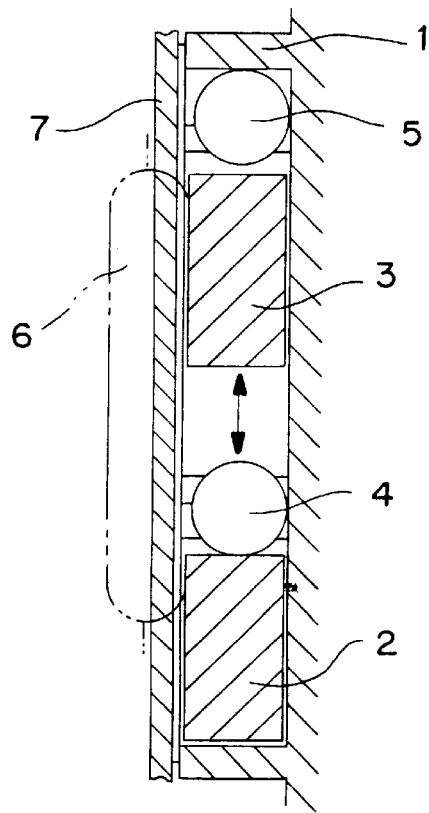
FIG. 2 is another partial sectional view of the vibration sensor of FIG. 1.

Referring, now, to FIGS. 1 and 2, there are shown partial sectional views of a vibration sensor viewed at different view angles as a first embodiment of this invention. This vibration sensor is installed in a pedometer having a housing 1. A cylindrical magnet 2 is fixed to a lower portion of housing 1, and a cylindrical movable magnet 3 is slidably supported by housing 1 in a magnetically repulsive relationship with magnet 2. A ball-shaped cushion 4 is interposed between magnets 2 and 3 as a buffer member to absorb a vibration when movable magnet 3 moves toward stationary magnet 2. A ball-shaped cushion 5 is interposed between movable magnet 3 and housing 1 to absorb a shock when movable magnet 3 hits an upper portion of housing 1. Thus, the movable magnet 3 is supported for a up-and-down movement between cushions 4 and 5. A reed switch 6 is disposed near the housing 1 to sense magnetic force of the movable magnet 3, and mounted on a circuit board 7 installed in the pedometer.

Stationary and movable magnets 2 and 3 are disposed in a repulsive relationship, in which the movable magnet 3 stands still at an upper position within housing 1 as shown in FIGS. 1 and 2 when any step motion is not executed. Upon step motion its vibration makes the movable magnet 3 move downwardly toward the stationary magnet 2. When movable magnet 3 strongly moves towards stationary magnet 2 by a big vibration, it does not directly contact the stationary magnet because the vibration by movable magnet 3 is buffered by cushion 4. When the movable magnet 3 stops in a downward movement, it starts to move upwardly because of a repulsive force by stationary magnet 2 and a vibration by a subsequent step motion. Any rapid upward movement of movable magnet 3 is buffered by cushion 5, and its shock is not applied to housing 1.

Thus, up-and-down or back-and-forth movement of movable magnet 3 is repeated on each step motion, and reed switch 6 simultaneously executes an on-and-off operation to count the number of steps.

Figure 3:
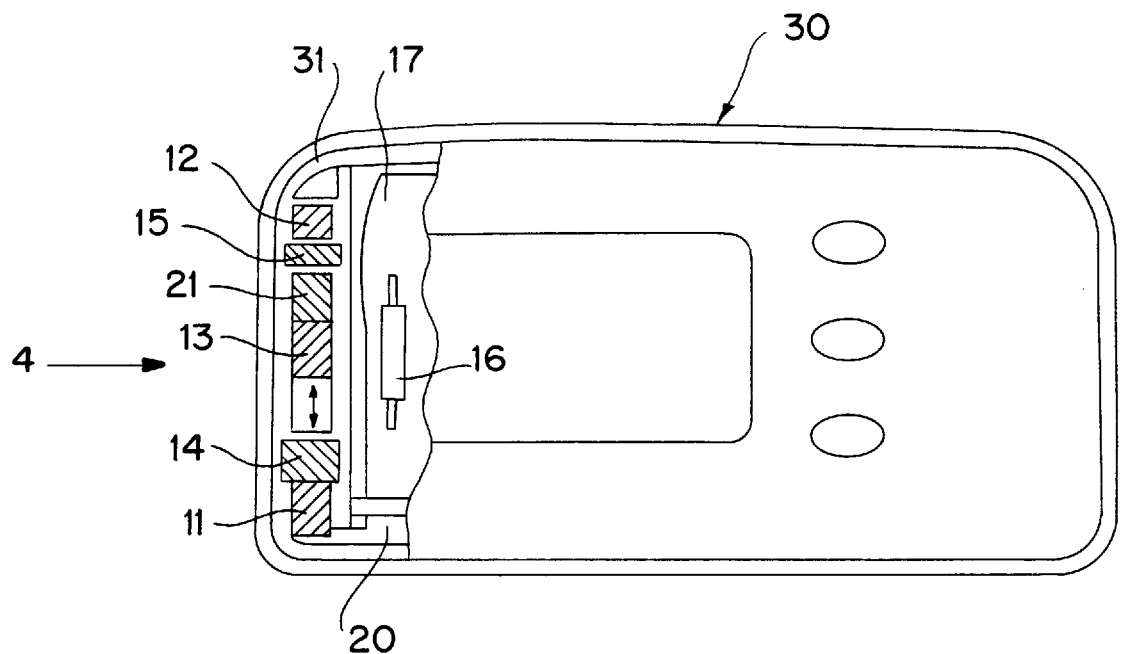
FIG. 3 is a partially broken view of a vibration sensor as a second embodiment of this invention.
Figure 4:
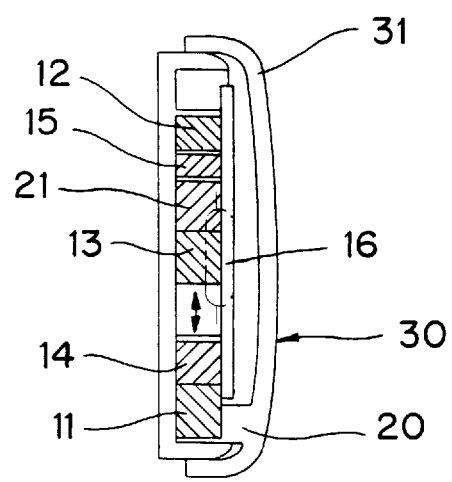
FIG. 4 is a sectional view of the vibration sensor viewed from a direction marked by an arrow mark A in FIG. 3.

In FIG. 3 (partially broken sectional view) and FIG. 4 (viewed from an arrow mark A in FIG. 3), there is shown a vibration sensor employed in a pedometer 30 which includes three magnets 11, 12 and 13 as a second embodiment of this invention. The stationary magnet 11 is fixedly disposed to a lower portion of one end of a housing 31 of pedometer 30 and the stationary magnet 12 is fixedly disposed to an upper portion of the one end. The movable magnet 13 is slidably supported between magnets 11 and 12. The movable magnet 13 is disposed in a magnetically repulsive relationship with magnet 11 but in a magnetically attracting relationship with magnet 12. Cushions 14 and 15 made of elastic materials such as Poron are disposed between magnets 11 and 13 and between magnets 12 and 13 respectively. A reed switch 16 is disposed near movable magnet 13 to sense a magnetic force of the movable magnet and mounted on a circuit board 17.

In this embodiment, there is disposed a sensitivity adjusting knob 20 as a stationary magnet moving means to move the stationary magnet 11 at the lower portion toward upper position (movable magnet 13), and exposes outwardly of a housing 31 of pedometer 30. Upon operation of knob 20, the distance between magnets 11 and 12 is varied so as to vary an initial standstill position of movable magnet 13 and an ON/OFF operating point of reed switch 16, whereby the sensitivity of magnetic detection about the movable magnet 13 can be adjusted. As stationary magnet 11 is moved toward movable magnet 13, the magnet 11 approaches the movable magnet 13 for strengthening the magnetically repulsive action by both magnetics to enhance the sensitivity, while as it is moved away from the movable magnet, the sensitivity is reduced. Moreover, a weight 21 of a nonmagnetic substance made of stainless steel or the like is mounted on movable magnet 13 to stabilize the initial standstill position of the movable magnet, viz. the position when any step motion is not executed.

In this vibration sensor at its initial position, movable magnet 13 coupled with weight 21 is located at an upper side of housing 31, viz. at the side of cushion 15 (FIGS. 3 and 4). Upon application of a vibration by a step motion, movable magnet 13 moves downwardly. As the downward movement stops, the movable magnet is moved upwardly by a subsequent reversal vibration and a repulsive operation of stationary magnet 11. Then, by a subsequent vibration the movable magnet 13 is again moved downwardly. The magnetic force of movable magnet 13 in an up-and-down motion turns on-and-off reed switch 16 to count the number of steps. Because of biassed effect by attracting force of upper stationary magnet 12, the stroke of movable magnet 13 is enlarged and the response of the movable magnet about a vibration is improved. Any rapid downward or upward motion of movable magnet 13 is buffered by cushion 14 or 15. If desired, the stationary magnet 12 of this embodiment may be replaced with a magnetic substance.

Figure 5:
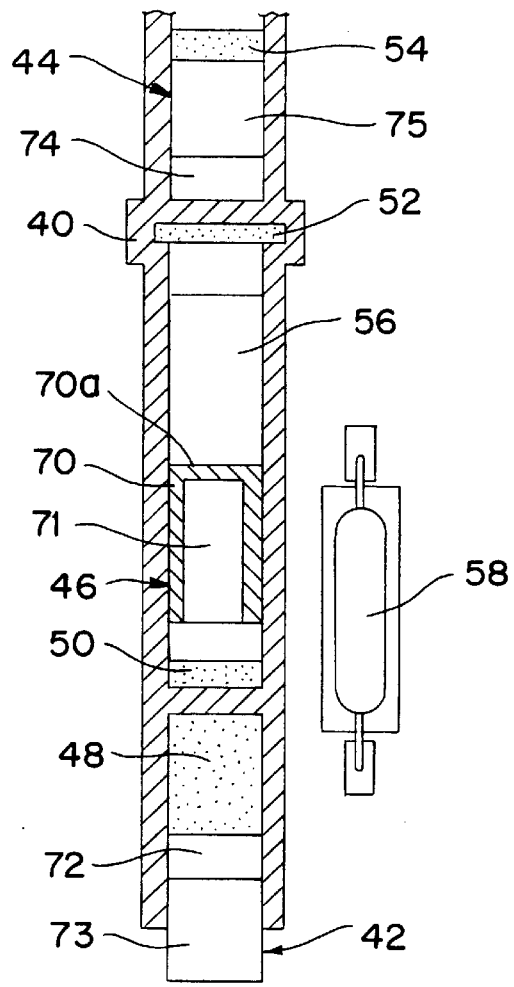
FIG. 5 is a partial sectional view of a vibration sensor as a third embodiment of this invention.
Figure 6:
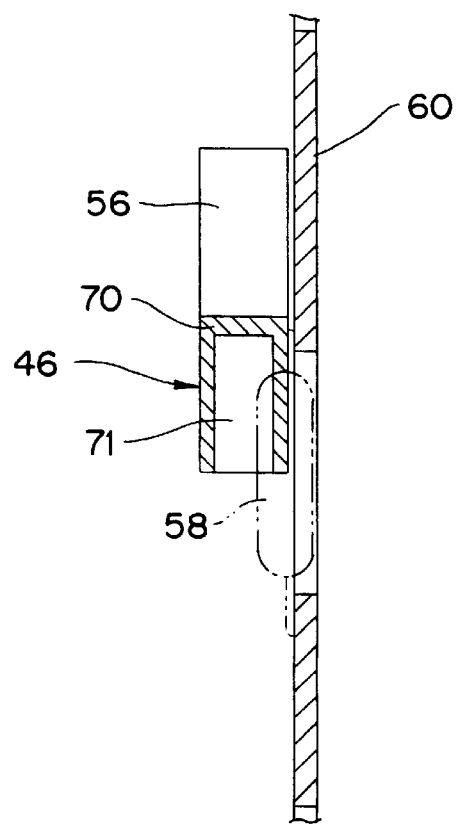
FIG. 6 is a partial sectional view of the vibration sensor of FIG. 5 viewed in a different angle.

FIG. 5 shows a vibration sensor as a third embodiment of this invention. A stationary magnet unit 42 is fixedly disposed on a lower portion of a housing 40. Another stationary magnet 44 is fixedly disposed on an upper portion of the housing for biassing. A movable magnet 46 is supported between magnets 42 and 44 for an upward-and-downward movement. A cushion 48 is disposed above stationary magnet unit 42, a cushion 50 is disposed under movable magnet unit 46, a cushion 52 is disposed above the unit 46, and a cushion 54 is disposed above stationary magnet unit 44. A weight 56 is coupled with movable magnet unit 46 as a single unit. As shown in FIGS. 5 and 6, a reed switch 58 switched by an up-and-down movement of the movable magnet unit 46 is disposed outwardly of housing 40, and mounted on a circuit board 60.

The vibration sensor of FIG. 5 is featured by units 42, 44 and 46. The movable magnet unit 46 includes a cylindrical magnet 71 installed within a holder 70 made of materials having a high slidability. The materials having such a high slidability may be polyacetal (POM), ABS comprising silicone or the like. The holder 70 at its upper end has a flange 70a. As shown in FIG. 5, the flange 70a of holder 70 is disposed to slide on an inner wall of housing 40. The stationary magnet unit 42 is a single unit consisting of a magnet 72 and a spacing member 73 disposed below the magnet. The stationary magnet unit 44 is a single unit consisting of a magnet 74 and a spacing member 75 disposed above the magnet.

The flange 70a contacts the inner wall of housing 40 on an up-and-down movement of movable magnet unit 46, whereby a contact area between unit 46 and housing 40 is reduced and the movement of unit 46 is smoothed. Magnet 71 is free from worn away because holder 70 slides on the inner wall of housing 40. If desired, only flange portion 70a may have high slidability materials.

In comparison with the vibration sensor of the first embodiment as shown in FIG. 1, the vibration sensor of this embodiment has the advantages that when it is employed in a pedometer, the movable magnet unit 46 is improved about abrasion against its frequent movement within housing 40 and about its smooth movement reducing friction against the housing because of the high slidability member. Accordingly, any worn away obstacle by abrasion of the movable magnet unit is avoided and its productivity life is elongated. Thus smooth movement by the movable unit ensures a rapid response of this vibration sensor.

Though not shown in FIG. 5, the sensitivity adjusting knob mentioned in the above second embodiment may be employed in this embodiment in such a manner that as stationary magnet unit 42 is moved upwardly by an operation of the sensitivity adjusting knob, spacing member 73 serves as a guide for magnet 72. Accordingly, the sensitivity can be smoothly adjusted to the knob without inviting the inconvenience that magnet 72 is tilted by the knob operation to be hardly moved or to stop.

FIG. 7 shows modifications of the movable magnet unit 46. In FIG. 7(a), a modified movable magnet unit 46' includes a holder 80 at upper and lower ends thereof being provided with flanges 80a and 80b which ensure the stability of the vertical movement of the unit 46'. In FIG. 7(b), another modified movable magnet unit 46" includes a magnet 83 completely covered by a holder 82 at upper and lower ends thereof provided with flanges 82a and 82b.

FIG. 8 shows modifications of stationary magnet unit 42. In FIG. 8(a), a modified stationary magnet unit 42' includes a magnet 85 and a holder 86 covering a side wall and a bottom wall of magnet 85. The holder 86 is made of high slidability materials and also serves as a spacing member. In this unit 42', the side wall of magnet 85 is covered by holder 86, and free from direct contact with the inner wall of the housing. Upon operation of the knob for sensitivity adjustment, holder 86 slides on the inner wall of the housing. Thus, on the operation of the knob, unit 42' is smoothly moved and prevented from inclination. FIG. 8(b) shows another modified stationary magnet unit 42" in which a magnet 87 is completely covered by a holder 88.

Figure 9:
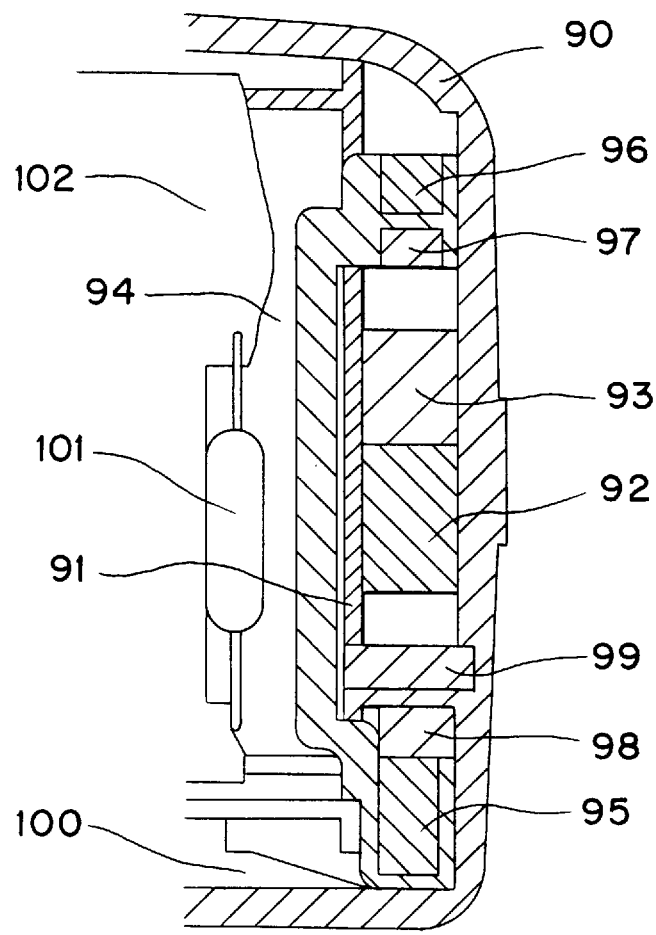
FIG. 9 is a partial sectional view of a vibration sensor as a fourth embodiment of this invention.

Referring to FIG. 9, there is shown a vibration sensor installed in a pedometer as a fourth embodiment of this invention. A movable magnet 92 coupled with a weight 93 as a single unit is movably supported by a housing 90 of the pedometer and a wall 91 disposed along the housing 90. A magnet holder 94 is disposed for a relative movement with movable magnet 92. The holder 94 has a configuration shown in FIG. 9. The holder at a lower portion thereof is provided with stationary magnet 95 in a held and fixed fashion, and at an upper portion thereof with stationary magnet 96 and a cushion 97 which is disposed below magnet 96. A cushion 98 for magnet 95 and a cushion 99 for movable magnet 92 are disposed respectively. A sensitivity adjustment knob 100 for moving magnet holder 94 is disposed at a lower portion of housing 90, and a reed switch 101 switched by the movement of movable magnet 92 is mounted on a board 102.

Magnetic holder 94 is vertically moved by operating the knob 100. Upon moving holder 94 upwardly, stationary magnet 95 moves upwardly against cushion 98 and stationary magnet 96 moves upwardly. Thus, stationary magnets 95 and 96 simultaneously move in a relative relationship with movable magnet 92, while the distance between magnets 95 and 96 is not changed. This is different from the above-mentioned embodiments. The sensitivity can be adjusted by knob 100 without changing magnetic force.

Figure 10:
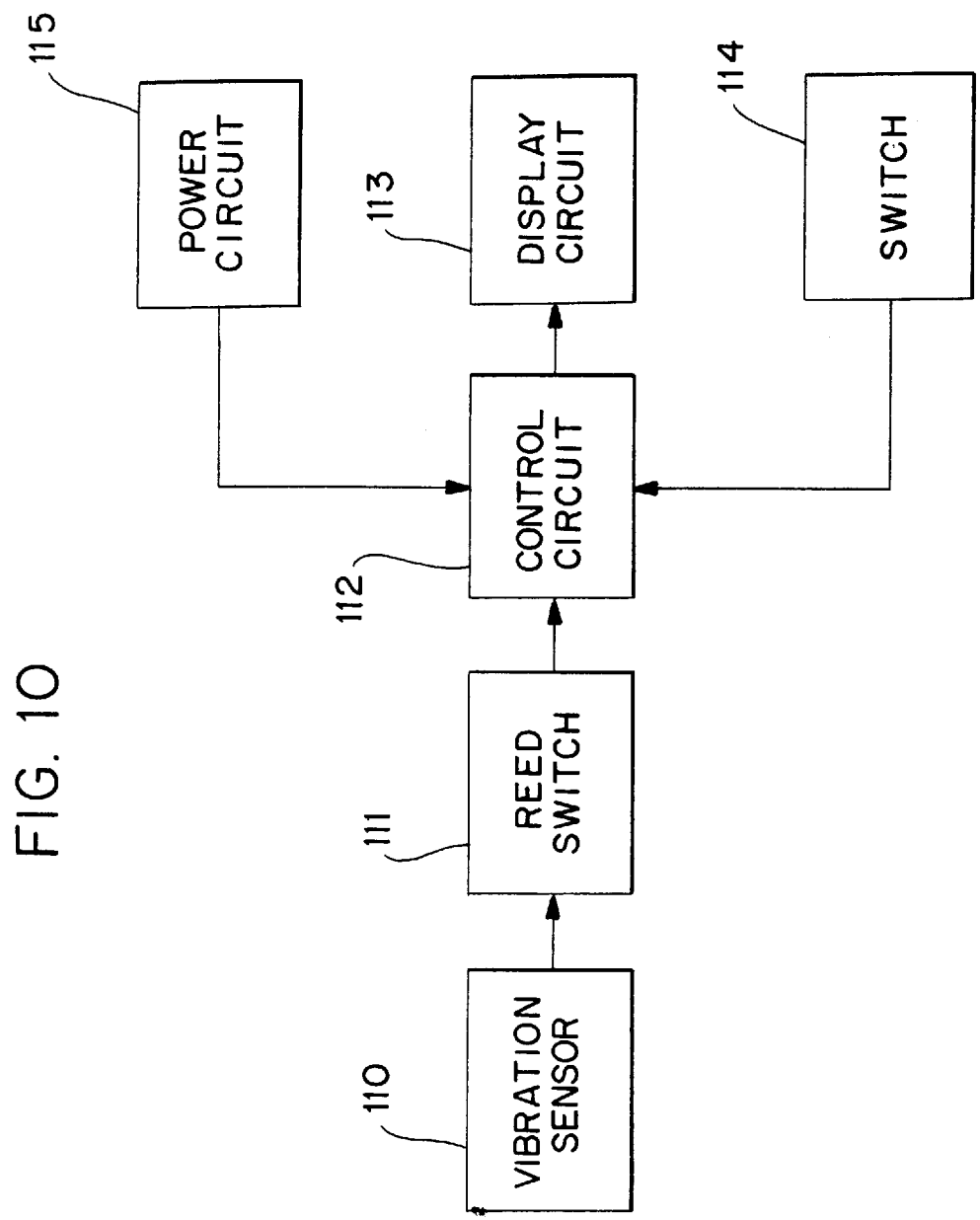
FIG. 10 a circuit block diagram of a pedometer employing a vibration sensor as a fifth embodiment of this invention.

In FIG. 10, there is shown a circuit block diagram of a pedometer employing a vibration sensor 110 as a fifth embodiment of this invention. The vibration sensor 110 may be any vibration sensor mentioned in the above embodiments. A reed switch 111 is turned on-and-off by the magnet force of a movable magnet in an up-and-down movement to count one step. A control circuit 112 composed by a microcomputer and its peripheral circuits detects ON/OFF of reed switch 111 and displays the counted number of steps through a display circuit 113 having a LCD display. A switch 114 is disposed for changing an operation of control circuit 112, and a power circuit 115 is a power source supplied by a battery for the pedometer.

Thus, this invention has been described and illustrated with respect to certain embodiments which give satisfactory results, it will be understood by those skilled in the art, after understanding the purpose of the invention, that various other changes and modifications may be made without departing from the spirit and scope of the invention, and it is therefore, intended in the appended claims to cover all such changes and modifications.

What is claimed is:

1. A vibration sensor comprising
   a stationary magnet fixedly disposed at a lower position,
   a magnetic material fixedly disposed at an upper position,
   a movable permanent magnet positioned between said stationary magnet and said magnetic material to be moved by application of external vibration, said movable permanent magnet being disposed in a magnetically repulsive relationship with said stationary magnet and a magnetically attractive relationship with said magnetic material, and
   sensing means for sensing movement of said movable permanent magnet by the external vibration.

2. A vibration sensor according to claim 1 further comprising a buffer interposed between said stationary magnet and said movable permanent magnet.

3. A vibration sensor according to claim 1 further comprising a housing, in which said movable permanent magnet is slidably supported within said housing and at least a slidable surface of said movable permanent magnet against said housing is provided with a high slidability member.

4. A vibration sensor according to claim 1 further comprising a stationary magnet moving means for moving said stationary magnet back and forth relative to said movable permanent magnet.

5. A vibration sensor according to claim 1, in which said sensing means is a reed switch.

6. A vibration sensor comprising
   a stationary magnet fixedly disposed at a lower position,
   a magnetic material fixedly disposed at an upper position,
   a movable permanent magnet vertically positioned between said stationary magnet and said magnetic material to be moved by application of external vibration, said movable permanent magnet being disposed in a magnetically repulsive relationship with said stationary magnet and a magnetically attractive relationship with said magnetic material, and
   sensing means for sensing movement of said movable permanent magnet by the external vibration.

7. A vibration sensor according to claim 6 further comprising a buffer interposed between said stationary magnet and said movable permanent magnet.

8. A vibration sensor according to claim 6 further comprising a housing, in which said movable permanent magnet is supported within said housing for a vertically slidable movement and at least a slidable surface of said movable permanent magnet against said housing is provided with a high slidability member.

9. A vibration sensor according to claim 8 in which a periphery of said high slidability member is provided with a flange slidable on an inner wall of said housing.

10. A vibration sensor according to claim 6, in which said movable permanent magnet is provided with a weight.

11. A vibration sensor according to claim 6 further comprising a stationary magnet moving means for moving said stationary magnet back and forth relative to said movable permanent magnet.

12. A vibration sensor comprising
   a first stationary magnet fixedly disposed at a lower position,
   a second stationary magnet fixedly disposed at an upper position,
   a movable permanent magnet movably held between the upper and lower positions, said movable permanent magnet being disposed in a magnetically repulsive relationship with said first stationary magnet and a magnetically attractive relationship with said second stationary magnet, and
   sensing means for sensing movement of said movable permanent magnet.

13. A vibration sensor according to claim 12 further comprising a buffer interposed between said first stationary magnet and said movable permanent magnet.

14. A vibration sensor according to claim 12 further comprising a buffer interposed between said second stationary magnet and said movable permanent magnet.

15. A vibration sensor according to claim 12 further comprising a housing, in which said movable permanent magnet is supported within said housing for a vertically slidable movement and at least a slidable surface of said movable permanent magnet is provided with a high slidability member.

16. A vibration sensor according to claim 15 in which a periphery of said high slidability member is provided with a flange slidable on an inner wall of said housing.

17. A vibration sensor according to claim 12 further comprising a housing, in which said stationary magnet at the lower position is supported within said housing and at least a slidable surface of said movable permanent magnet against said housing is provided with a high slidability member.

18. A vibration sensor according to claim 12, in which said movable permanent magnet is provided with a weight.

19. A vibration sensor according to claim 12 further comprising a stationary magnet moving means for moving one of said first and second stationary magnets back and forth relative to said movable permanent magnet.

20. A vibration sensor according to claim 12 further comprising a housing, and a spacing member which extends downwardly of said stationary magnet at the lower position and near an inner wall of said housing.

21. An apparatus comprising
   a first stationary magnet,
   a second stationary magnet,
   a movable permanent magnet positioned between said first and second stationary magnets and movable permanent by application of external vibration, said movable magnet being disposed in a magnetically repulsive relationship with said first stationary magnet and a magnetically attractive relationship with said second stationary magnet,
   sensing means for sensing movement by said movable permanent magnet by the external vibration to generate outputs,
   circuit means responsive to said outputs.

22. An apparatus according to claim 21, in which said circuit means is a counter for counting a number of said outputs to generate a counted value.

23. An apparatus according to claim 21, in which said apparatus is a pedometer.

24. A method comprising
   providing a movable permanent magnet positioned between first and second stationary magnets and disposed in a magnetically repulsive relationship with the first stationary magnet and a magnetically attractive relationship with the second stationary magnet,
   moving said movable permanent magnet opposed to a stationary magnet by application of external vibration,
   sensing the movement of said movable permanent magnet, and
   generating signals according to the movement of said movable permanent magnet.

25. A method according to claim 24 further comprising
   responding to signals generated according to the movement of said permanent movable magnet.

26. A method according to claim 24 further comprising
   counting said signals generated according to the movement of said permanent movable magnet.

* * * * *